United States Patent
Showler

[19]

[11] Patent Number: 5,873,976
[45] Date of Patent: Feb. 23, 1999

[54] SEALING MECHANISM

[75] Inventor: Michael F. Showler, Waterford, Mich.

[73] Assignee: Elopak Systems AG, Glattbrugg, Switzerland

[21] Appl. No.: 810,662

[22] Filed: Mar. 3, 1997

[51] Int. Cl.⁶ .................................................. B29C 65/08
[52] U.S. Cl. ..................... 156/580.2; 156/69; 156/73.1; 156/358; 53/477
[58] Field of Search ........................... 156/69, 73.1, 358, 156/580.2, 583.1; 53/477

[56] References Cited

U.S. PATENT DOCUMENTS

| 3,499,808 | 3/1970 | Obeda . | |
|---|---|---|---|
| 3,886,012 | 5/1975 | Slater . | |
| 3,912,576 | 10/1975 | Braun | 156/580.2 |
| 3,971,300 | 7/1976 | Bachner . | |
| 4,007,671 | 2/1977 | Duncan . | |
| 4,572,753 | 2/1986 | Bach . | |
| 4,767,492 | 8/1988 | Fukusima et al. . | |

*Primary Examiner*—Michael W. Ball
*Assistant Examiner*—Sam Chuan Yao
*Attorney, Agent, or Firm*—Reising, Ethington, Learman & McCulloch, PLLC

[57] ABSTRACT

A sealing mechanism for sealing thermoplastic-coated container sealing fins, including a movable sealing jaw and an oppositely disposed fixed sealing jaw. The sealing jaws have parallel, dead-ended grooves formed in the sealing surface thereof, wherein two adjacent grooves cross each other in an X-configuration at their longitudinal mid-point. Engagement of the inter-groove lands against heated outer sealing panels causes the thermoplastic to become molten and flow to the X-configuration area. When cooled, the concentrated thermoplastic serves to seal off the crevice between adjacent folded-over, inner panel segments of the container sealing fin.

15 Claims, 2 Drawing Sheets

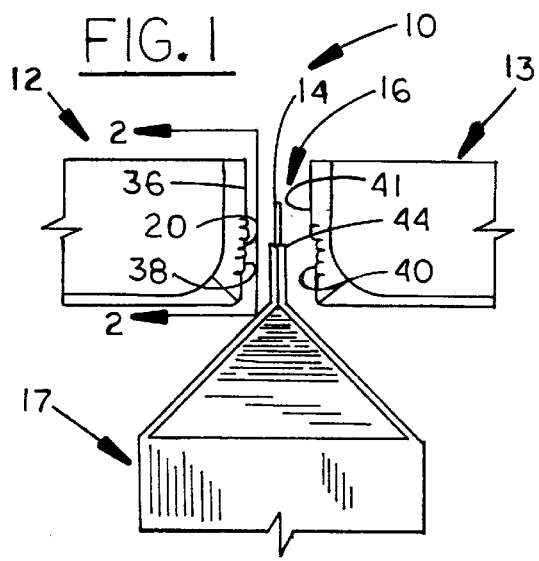
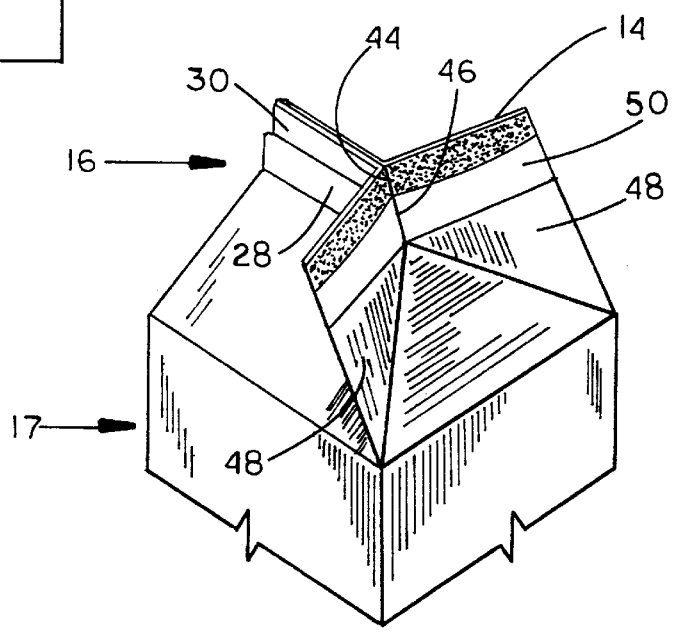
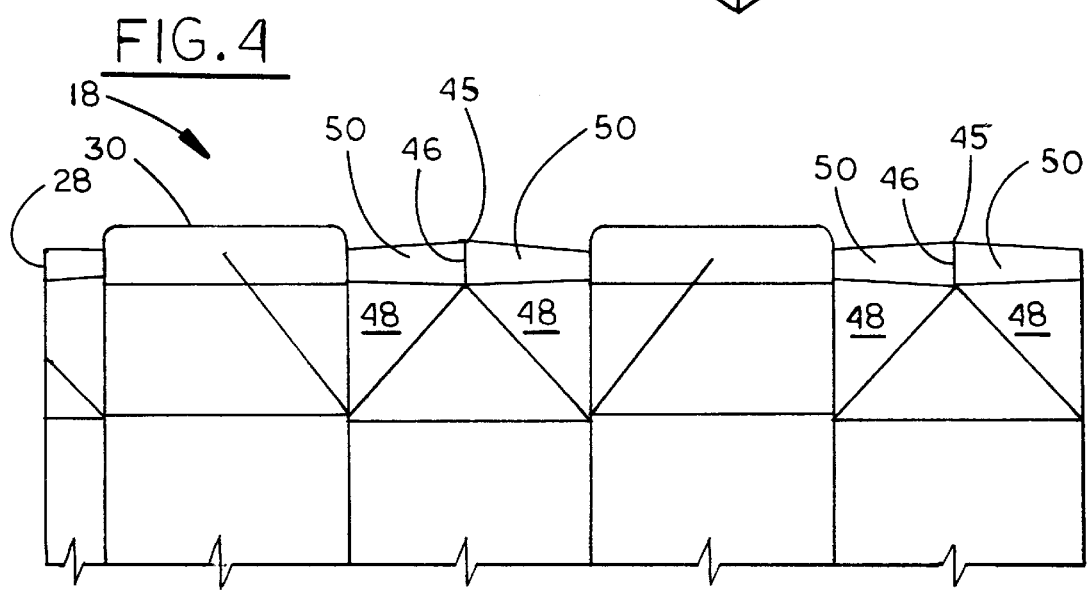

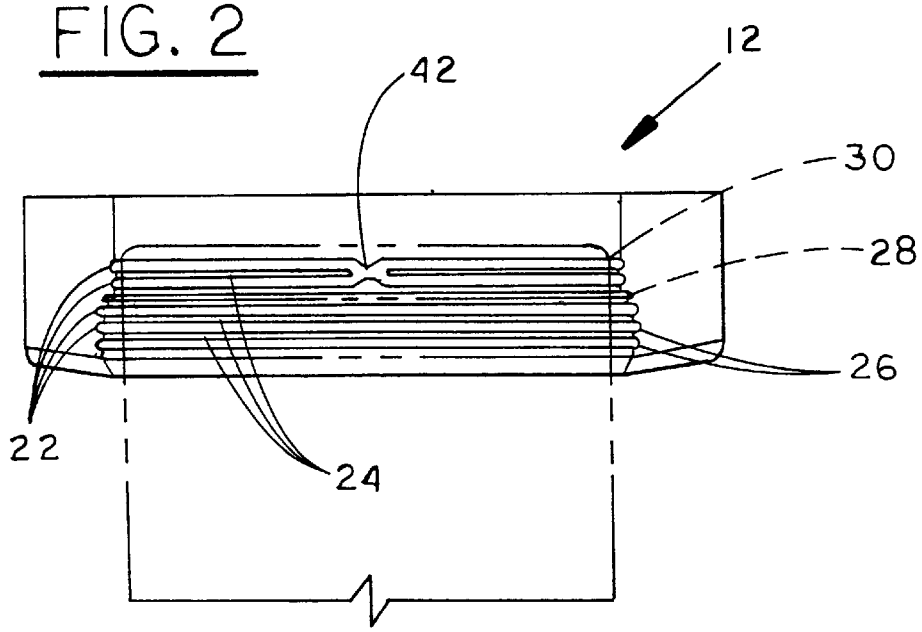
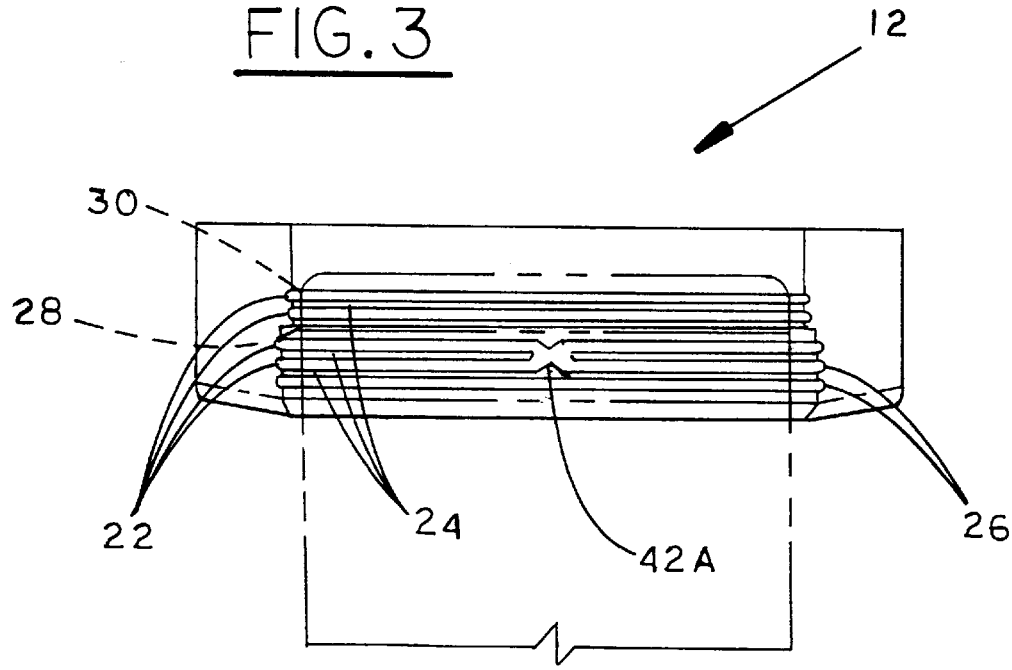

5,873,976

SEALING MECHANISM

FIELD OF THE INVENTION

This invention relates generally to sealing jaws for sealing thermoplastic-coated container sealing panels therebetween and, more particularly, to an improved contoured sealing surface formed on the face of at least one of the sealing jaws.

BACKGROUND ART

Bach U.S. Pat. No. 4,572,753 discloses a welding tip 10, which may be affixed to an anvil 20 to cooperate with an ultrasonic horn 50, or to the horn to cooperate with the anvil, and which includes a plurality of conical projections 12 alternately interspersed with a plurality of semi-spherical reservoirs 14, or parallel feeder trough portions 26 connected to troughs 22 and 24. The adjacent sheet of material 40 is softened upon being contacted by the conical projections, and displaced to become accumulated in the reservoirs to avoid overheating.

Obeda U.S. Pat. No. 3,499,808 discloses a horn 14 having spherical cylindrical depressions 22 formed therein, for engaging material 17 projected through an aperture 19 of a second material 18, to thereby soften the projection material into a head which is peened over into a rivet-like form.

Slater U.s. Pat. No. 3,886,012 discloses a horn 62 having circular openings or depressions 68 formed in the face thereof for directly opposing aligned openings or depressions 42 formed in a sheet 16, with an intermediate thin, flexible sheet 52.

Each of Bachner U.S. Pat. No. 3,971,300, Fukusima et al U.S. Pat. No. 4,767,492, and Walke U.S. Pat. No. 4,011,800 discloses a horn and a mandrel having oppositely disposed, variably shaped, cooperating projections and depressions adapted to seal various overlapped thicknesses of panels therebetween.

Referred to as prior art in Fukusima et al U.S. Pat. No. 4,767,492, FIGS. 13A, B and C disclose a horn 1 in which a plurality of parallel grooves and ridges 42 extend in a longitudinal direction across the full width of the horn contact surface 3.

European Patent No. 0 185 325 discloses a sealing tool having recessed rhombus-shaped surfaces 6 formed in a flat surface 5, and, alternately, raised rhombus-shaped surfaces 6 formed on the flat surface 5.

DISCLOSURE OF THE INVENTION

A general object of the invention is to provide an improved sealing mechanism for application to thermoplastic-coated container sealing fin arrangements.

Another object of the invention is to provide such a sealing mechanism wherein grooves and lands are selectively formed on the face of at least one sealing jaw.

A further object of the invention is to provide such a sealing mechanism in which discrete recesses are formed in the sealing surface of at least one sealing jaw to provide a discontinuous low pressure area surrounded by a continuous high pressure area.

A still further object of the invention is to provide a sealing jaw arrangement including a sealing jaw having parallel, dead-ended grooves formed in the face thereof, wherein two adjacent grooves cross each other in an X-configuration at their longitudinal mid-point, the lands alternating with the grooves serving to cause molten thermoplastic on container sealing panels to flow to the X-configuration area and thereby, when cooled, to seal off the crevice between adjacent infolded panel segments of the container sealing fin.

These and other objects and advantages will become more apparent when reference is made to the following drawings and accompanying description.

BRIEF DESCRIPTION OF THE DRAWINGS

FIG. 1 is a side elevational view of fixed and movable sealing jaws on opposite sides of a container sealing fin arrangement;

FIG. 2 is a view taken along the plane of the line 2—2 of FIG. 1, and looking in the direction of the arrows;

FIG. 3 is a view similar to FIG. 2, but showing an alternate embodiment thereof;

FIG. 4 is a fragmentary plan view of a blank from which a gable top carton is formed; and FIG. 5 is a fragmentary perspective view of a gable top carton formed from the FIG. 4 blank, and in a partially open condition.

BEST MODE FOR CARRYING OUT THE INVENTION

Referring now to the drawings in greater detail, FIG. 1 illustrates a contoured sealing mechanism 10, including a movable sealing jaw 12 and a fixed sealing jaw 13 for sealing together certain panels of a conventional top closure 16 of a thermoplastic-coated paperboard carton 17 (FIG. 5) formed from a blank 18 (FIG. 4).

As shown in FIG. 2, the sealing face 20 of the movable sealing jaws 12 includes a plurality of laterally extending, parallel grooves 22 and lands 24, with each groove terminating at closed ends 26 within the outer edge of the width of the sealing jaw.

A typical gable top carton 17 sealing fin arrangement includes a group 28 of panel segments four segments thick, as shown in FIG. 5, topped off by a group 30 of panel segments two segments thick. To accommodate the different overall thicknesses, a predetermined number, such as a pair of grooves 22 and lands 24 serve as a step 36 extending beyond a second predetermined number of, say, four, grooves and lands on a set-back step 38 (FIG. 1) at the face 20 of sealing jaw 12, as shown in FIG. 1. The fixed jaw 13 has a recessed flat faced step 40 and an upper flat face 41 formed thereon, opposite the respective steps 38 and 36.

Referring once again to FIG. 2, it is noted that the two grooves 22 of the projecting step 36 come together in an X-configuration 42, at the middle portion of their lengths to thereby interrupt the land 24 intermediate the two grooves.

The location of the X-configuration 42 of the grooves 22 is on the group 30 just above a crevice 44 (FIG. 5) which evolves from points 45 on the blank 18, and naturally occurs at the adjacent folded scorelines 46 (FIG. 4) of the inwardly folded panels 48 (FIG. 5) of the carton top closure 16 at the final sealing thereof between the sealing jaws 12 and 13.

The above described grooves 22/lands 24/closed ends 26/X-configuration 42 arrangement is such that a thermoplastic coating on the sealing fin upper portion formed by the group 30 of panel segments two segments thick is displaced by the lands 24 towards the grooves 22 and there trapped by the terminal points 26 from flowing outwardly, and instead, is directed by the X-configuration 42 onto the top of the crevice 44, serving to seal off any upward opening at the crevice, and making it "gas tight".

Alternately, as shown in FIG. 3, an X-configuration 42A may be formed at the center of two of the grooves 22 on the set-back step 38 of the sealing jaw 12. However, it has been determined that, upon any panel being folded onto itself, as is the case with the sealing panel segments 50 (FIG. 4) of the row 28 about the respective scorelines 46, a, so-called, "knot edge", or rounded edge thicker than two segments, normally occurs, making sealing off of the crevice 44 between adjacent knot edges by a flow of thermoplastic more difficult. Hence, while it is possible to accomplish a gas-tight seal of the crevice 44 between the adjacent scorelines 46, it is preferable to accomplish the sealing at the top of the crevice 44, as explained above.

INDUSTRIAL APPLICABILITY

It should be apparent that the inventive sealing jaw configuration provides a compact and efficient means for sealing off a crevice which tends to be formed at the center of the sealing fin arrangement of a gable top type closure on liquid-carrying containers.

It should also be apparent that the inventive grooves, lands and groove interconnection may be formed on a sealing jaw surface which is applied to a heated thermoplastic-coated sealing fin, or that the sealing jaw surface may be an ultrasonic horn surface which is applied to an unheated thermoplastic-coated sealing fin.

It should be further apparent that the discrete recesses provided by the grooves 22 are surrounded by peripheral land, whereby a high pressure sealing zone surrounds and thus contains a discontinuous low pressure sealing zone.

While but one general embodiment of the invention, in alternate locations, has been shown and described, other modifications are possible within the scope of the following claims. For example, the central concentration zone 42 may be of configurations other than an X-configuration and fewer or more than two grooves may extend thereto. Moreover, it is not necessary for the seal-promoting groove and land configuration to be formed in only one jaw; it may in some cases be preferred for it to be formed in both jaws. Moreover, while it may not be essential for the groove ends 26 to be closed rather than open, it is much preferred.

What is claimed is:

1. In a sealing mechanism including first and second sealing jaws for sealing a container sealing fin therebetween, wherein the sealing fin has a thermoplastic coating thereon and at least one of the sealing jaws has at least two grooves in the face thereof, the improvement comprising continuously extending lands adjacent said grooves and means associated with said grooves for causing the thermoplastic coating to flow along said grooves toward a middle portion of the sealing fin, and, upon cooling, to serve as a concentrated sealant in said sealing fin, said means comprising a junction forming a cross-over between the adjacent grooves formed adjacent said middle portion.

2. The improvement described in claim 1, wherein said cross-over is in the form of an X.

3. The improvement described in claim 1, wherein said means includes said grooves having closed ends adjacent oppositely disposed edge portions of the face of the sealing jaw.

4. In a sealing mechanism including first and second sealing jaws for sealing a thermoplastic-coated container sealing fin therebetween, wherein at least one of the sealing laws has a plurality of parallel grooves formed in a continuously extending face thereof, the improvement comprising said grooves each having a predetermined length within the overall width of the sealing jaw, and two adjacent ones of said grooves each being interrupted by having a junction of the grooves formed at their mid-points, whereby the thermoplastic coating is cause to flow along said grooves toward said mid-points to serve as a concentrated sealant in the sealing fin.

5. The improvement described in claim 4, wherein each groove has closed ends at the ends of its predetermined length, with adjacent grooves being separated by an intermediate portion of said continuously extending face.

6. The improvement described in claim 4, wherein said junction is in an X-configuration.

7. A sealing mechanism for use in sealing-off a crevice formed at a center of a thermoplastic-coated container's oppositely disposed inner sealing panels in-folded between two outer sealing panels and onto their respective selves, the improvement comprising first and second sealing jaws, wherein at least one of the sealing jaws has a sealing face with at least one pair of grooves and an intermediate continuously extending land thereon and adapted to engage one of said outer sealing panels adjacent said crevice, said grooves having closed ends within the confines of said sealing face, and said pair of grooves including bends intercepting each other at a middle portion thereof adjacent said crevice to thereby interrupt said intermediate continuously extending land only at its middle portion, whereby the thermoplastic coating is caused to flow to said bends to seal said crevice.

8. The improvement described in claim 7, wherein said bends are positioned on said outer sealing panels just above the end of said crevice.

9. The improvement described in claim 7, wherein said bends are positioned on said outer sealing panels intermediate the overall height of said crevice.

10. The improvement described in claim 7, wherein said inner sealing panels are shorter than said two outer sealing panels, and said pair of grooves and said intermediate land are positioned adjacent said two outer sealing panels beyond said inner sealing panels, with said bends just beyond the outer end of said crevice.

11. The improvement described in claim 7, wherein said inner sealing fins are shorter than said two outer sealing panels, and said grooves and said intermediate land are positioned adjacent said two outer sealing panels beside said inner sealing panels, with said bends adjacent a mid-height of said crevice.

12. In a sealing mechanism including first and second sealing jaws for sealing a container sealing fin therebetween, wherein the sealing fin has a thermoplastic coating thereon and at least one of the sealing jaws has a sealing surface formed with a recess, the improvement comprising a plurality of discrete grooves which are formed in said recessed surface and are surrounded by continuously extending peripheral land of said recessed surface, with two adjacent grooves having a junction at substantially their mid-points to concentrate the flow of said thermoplastic coating to effectuate said sealing.

13. The improvement described in claim 12, wherein said discrete grooves are provided by parallel grooves.

14. The improvement described in claim 12, wherein said sealing surface comprises a projecting planar face and a set-back planar face set back relative to said projecting planar face, both planar faces being formed with said discrete grooves.

15. The improvement described in claim 14, wherein the discrete grooves are provided by parallel grooves.

* * * * *